United States Patent [19]

Smith

[11] 3,907,099

[45] Sept. 23, 1975

[54] FEEDER FOR HEADED OBJECTS

[76] Inventor: Arthur J. Smith, P.O. Box 3898, Visalia, Calif. 93277

[22] Filed: Mar. 13, 1974

[21] Appl. No.: 450,656

[52] U.S. Cl. ............ 198/220 BC; 198/256; 91/227
[51] Int. Cl.² ...................................... B65G 27/00
[58] Field of Search... 198/220 R, 220 BC, 220 DD, 198/256, 250, 220 BA, 220 CA, 220 CC, 289; 221/202, 204, 200, 167, 168, 169, 172, 183; 91/227, 234

[56] References Cited
UNITED STATES PATENTS

| | | | |
|---|---|---|---|
| 2,861,548 | 11/1958 | Burgess et al. | 198/220 DD |
| 3,133,670 | 5/1964 | Heyer | 198/220 BC |
| 3,276,625 | 10/1966 | Ziskal | 221/167 |
| 3,578,142 | 5/1971 | Burgess, Jr. | 198/220 BC |
| 3,744,576 | 7/1973 | Sudnishnikov et al. | 91/234 |
| 3,757,932 | 9/1973 | Baljet et al. | 198/220 BC |

Primary Examiner—Evon C. Blunk
Assistant Examiner—James M. Slattery
Attorney, Agent, or Firm—Huebner & Worrel

[57] ABSTRACT

The invention is embodied in a feeder for aligning headed objects, such as nails, preparatory to the discharge thereof to a magazine. The feeder is characterized by an open bowl for receiving an unordered mass of headed objects, a discharge chute disposed in spaced relation with said bowl for selectively discharging a plurality of discrete objects in ordered alignment, a delivery way provided as an integral part of the bowl and extended between the bottom of the bowl and the chute for conducting the objects therebetween as vibratory motion is imparted to the bowl, an intermittently operated pneumatic hammer for imparting vibratory motion to the bowl, and a pneumatic control circuit including a sensor for selectively activating the hammer in response to an absence of headed objects within the chute.

26 Claims, 21 Drawing Figures

FEEDER FOR HEADED OBJECTS

BACKGROUND OF THE INVENTION

The invention relates to feeders, and more particularly to a feeder adapted to receive an unordered mass of headed objects, such as nails and the like, in bulk form and to discharge the headed objects in ordered, single file alignment, to a magazine for a pneumatic driver such as the device disclosed in application Ser. No. 450,733, filed Mar. 13, 1974. It is here noted that while the feeder which embodies the principles of the instant invention has general utility in handling headed objects of the type including elongated shanks, the feeder has particular utility in aligning and feeding headed nails. Therefore, while the following description of the preferred embodiment makes frequent reference to nails, it is to be understood that the utility of the feeder is not limited to the feeding of nails and that the feeder can be employed in feeding headed objects of a general nature.

Among the various problems encountered by those engaged in the design and fabrication of automatic nailing devices, is that of aligning nails into an ordered alignment from an unordered mass of nails.

As can readily be appreciated by those familiar with the design and operation of automatic nailing devices, it is important that the nails employed be fed to such nailing devices quickly and economically while employing a simplified and reliable nail feeding mechanism.

It is therefore the general purpose of the instant invention to provide a simplified nail feeder capable of receiving nails in bulk form and rapidly aligning the received nails into an ordered alignment and thereafter rapidly discharging the aligned nails to magazines of pneumatic nailing devices with minimal manipulation.

OBJECTS AND SUMMARY OF THE INVENTION

It is an object of the instant invention to provide an improved feeder capable of discharging a plurality of headed objects such as common box nails and the like in single file alignment.

It is another object to provide an improved vibrator assembly including an improved pneumatic hammer for imparting vibratory motion to a feeder for headed objects.

It is another object to provide a vibration-responsive nail feeder particularly adapted to receive a mass of nails in bulk form and to thereafter discharge the nails in single file alignment to the magazines of pneumatic nailing devices.

It is another object to provide a nail feeder having a bowl for receiving a mass of nails in bulk form, a nail discharge chute disposed in space relation with the bowl, vibration-responsive delivery means for serially delivering a series of nails from the bowl to the discharge chute and a vibrator assembly for imparting vibratory motion to the vibration-responsive delivery means.

It is another object to provide an improved pneumatic vibrator assembly having particular utility with a nail feeder for imparting vibratory motion to the feeder, whereby nails responsively are advanced into a nail discharge chute from a nail receiving bowl provided for the feeder.

It is still another object to provide an improved vibrator control circuit coupled with an improved pneumatic hammer for a vibrator connected with a nail feeder for selectively activating the hammer to thus impart vibratory motion to the nail feeder.

These and other objects and advantages are achieved through the provision of a nail receiving bowl mounted on a pneumatically actuated vibrator assembly, a nail discharge chute disposed in spaced relation with the bowl and a nail delivery way forming an integral part of the bowl extended between the bottom of the bowl and the chute for conducting a series of nails from the floor of the bowl to the chute as vibratory motion is imparted thereto, as will become more readily apparent by reference to the following description and claims in light of the accompanying drawings.

DESCRIPTION OF THE PREFERRED EMBODIMENT (General Description)

Figure 1:
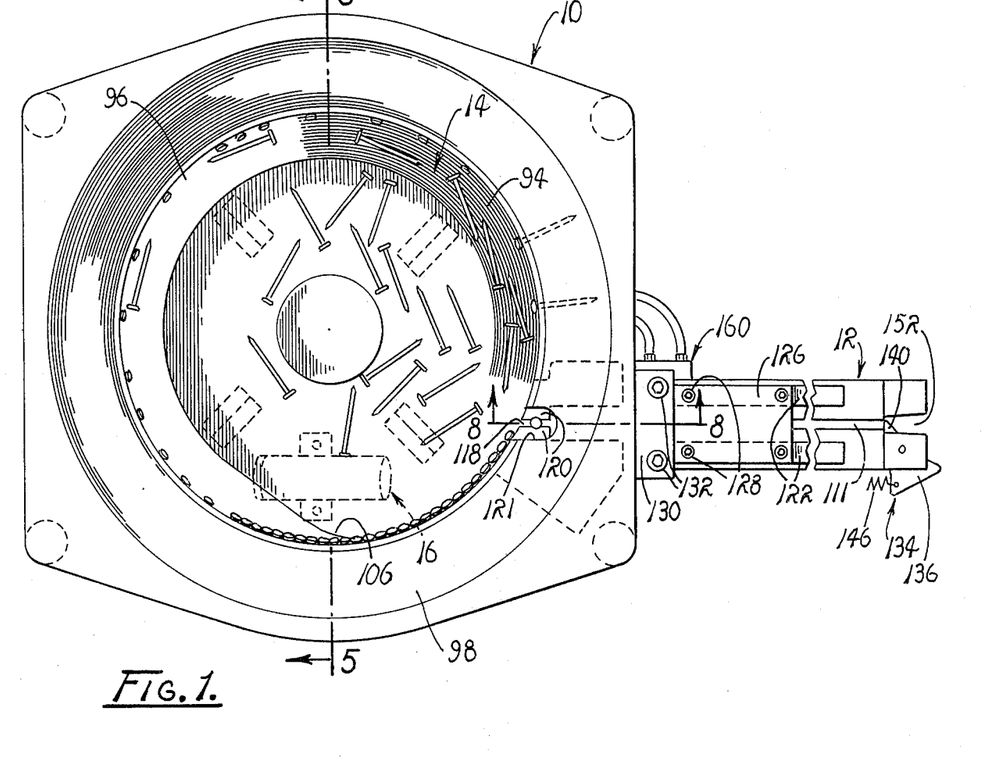
FIG. 1 is a top plan view of a nail feeder which embodies the principles of the instant invention, illustrating an open top bowl having deposited therein a mass of nails in bulk configuration, a nail discharge chute disposed in spaced relation with the bowl, a delivery way extended from the floor of the bowl to the chute for conducting a series of nails therebetween and a retainer of a circular configuration coaxially aligned with the bowl for supporting nails as they are advanced along the nail delivery way from the bowl to the chute.
Figure 2:
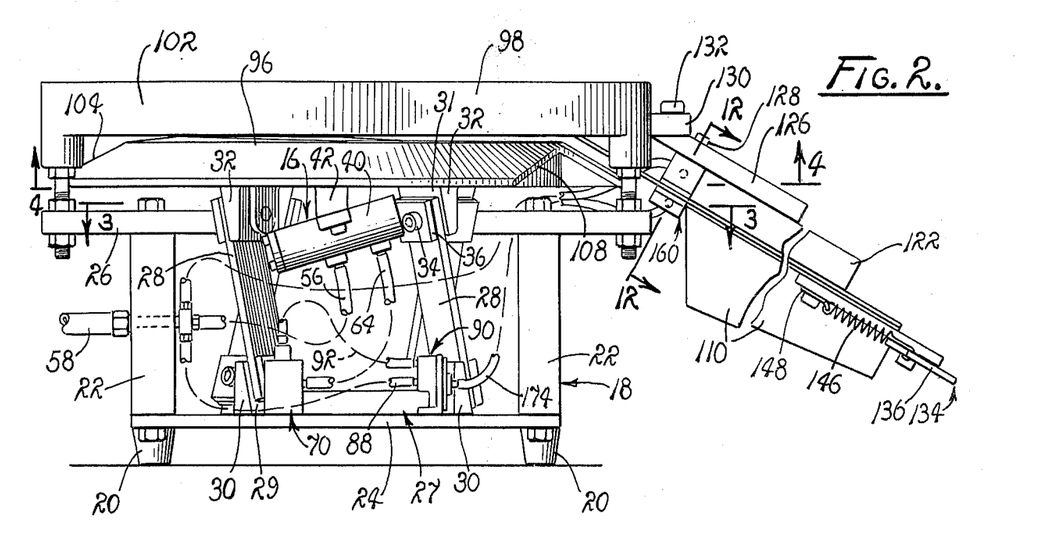
FIG. 2 is a side elevation of the feeder shown in FIG. 1 illustrating a vibrator assembly provided for imparting vibratory motion to the bowl and delivery way.
Figure 3:
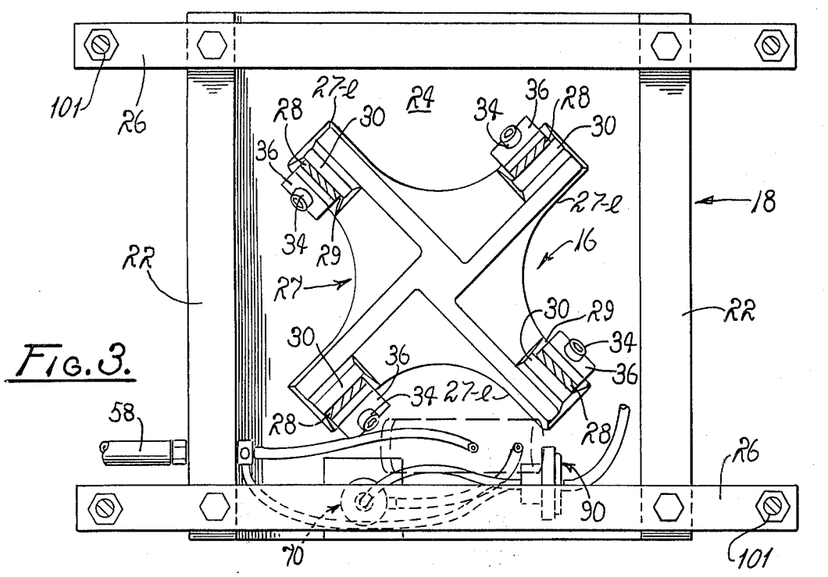
FIG. 3 is a cross sectional view taken generally along line 3—3 of FIG. 2, further illustrating the pneumatic vibrator assembly.

Referring now to the drawings, with more specificity, wherein like reference characters designate like or corresponding parts throughout the several views, there is shown in FIG. 1 a nail feeder which embodies the principles of the instant invention.

The nail feeder is a portable device which can easily and readily be transported to a situs of use. The nail feeder includes an open top bowl, generally designated 10, for receiving therein an unordered mass of nails. Normally such nails are delivered to the situs of use in bulk form. Therefore, in practice, the nails are deposited in the bowl 10 in bulk form.

Disposed in spaced relation with the bowl 10 there is an inclined, gravity fed nail discharge chute 12 which serves to receive a plurality of nails delivered serially thereto. The chute 12 serves as a nail discharge mechanism for discharging the nails from the feeder, in single file, to a receptacle, such as a magazine of a nailing device of the type described and claimed in the aforementioned copending application.

In order to accommodate passage of the nails from the bottom of the bowl 10 to the chute 12 there is provided a delivery way, designated 14, which extends from the bottom of the bowl to the chute, along which the nails are advanced in series. Motion is imparted to the nails, for causing them to advance along the delivery way 14, in response to vibratory motion imparted to the bowl 10 and the nail delivery way 14 by a vibrator assembly, generally designated 16.

(Vibrator System)

The vibrator system 16 is coupled with the bowl 10 in a supporting relationship and is supported by a portable open frame 18 resting on anti-skid pads 20.

As a practical matter, the frame 18 includes a pair of rectangular frame members 22 disposed in a pair of vertically oriented planes, a bottom plate 24 extended between the frame member and affixed thereto, and a pair of horizontally oriented elongated sills 26 extended in parallelism across the top of the frame members 22 and projected outwardly therefrom. Thus the frame members 22, the bottom plate 24, and the sills 26 are interconnected to form an integrated unit. Of course, the frame 18 is fabricated employing suitable fastening devices such as screws, bolts and the like.

Mounted on and fixed to the bottom plate 24 there is a spider 27 including a plurality of horizontally projected legs 27-1 to the distal end of the legs 27-1 there is affixed a plurality of inclined, vertical support members 28. Each of the support members 28 is formed of a resilient material and generally possesses the characteristics of a leaf spring.

The support members 28 are connected at their lowermost or base ends thereof with inclined planar faces 29 of a plurality of anchor lugs 30, which are, in turn, suitably provided at the distal ends of the plurality of projected legs of the spider 27. The lugs 30 are arranged in an annular array with the angle of inclination of the faces 29 being uniformly directed so that all of the support members 29 are upwardly inclined at a common angle and substantially in a common direction relative to the array. The particular angle at which the support members 28 are inclined, relative to a vertical plane, is varied as desired, however, an angle of approximately 20° has been found to be quite satisfactory.

Each of the vertical support members 28 also is connected at its uppermost end to a face 31 of a support lug 32 suspended from the lowermost surface of the bowl 10. The faces 31 of the lugs 32 are inclined at angles which are complimentary to the angles of the faces 29 of the lugs 30. Thus, the bowl 10 is supported by the support members 28 which, in operation, are flexed to impart vibratory motion of the bowl.

As a practical matter, the support members 28 are connected with the lugs 30 and 32 by a plurality of bolts 34 which extend through a plurality of cover pads 36 interposed between the heads of the bolts and the adjacent ends of the support members. The threaded shanks of the bolts 34 are received within screw-threaded bores provided within the lugs.

It is to be understood that oscillatory motion imparted to the bowl 10, about an axis passing vertically therethrough, causes the bowl 10 to move in both vertical and horizontal directions simultaneously due to the inclination of the support members 28. Thus, the bowl is caused to move forwardly and up and down in a backward direction, relative to the direction of the advancing nails, as vibratory motion is imparted to the bowl 10 by the vibrator assembly 16. This motion tends to toss the nails forward along the delivery way 14.

Vibratory motion is imparted to the bowl 10 in response to the operation of a pneumatic hammer 40 included in the vibrator assembly 16 and suspended from a pair of pedestals 42, also secured to the bottom of the bowl 10. As a practical matter, the hammer 40 is supported at an angle of inclination such that the longitudinal axis of symmetry thereof also is inclined at 20° with respect to a vertical plane, whereby the effects of the hammer are maximized as the forces of inertia are transmitted to the support members 28, as will hereinafter become more readily apparent.

The pneumatic hammer 40 includes a housing 44, as best illustrated in FIGS. 16 through 20, within which there is provided an elongated chamber 46 of a substantially cylindrical configuration. Within the chamber 46 there is seated a mass 48 also of a substantially cylindrical configuration. The mass 48 is of a length substantially less than the length of the chamber 46 and is provided with an outside diameter slightly less than the inside diameter of the chamber 46. Thus, the mass 48 is supported for reciprocation within the chamber 46 and has defined at its opposite end a pair of subchambers, designated A and B.

Figure 15:
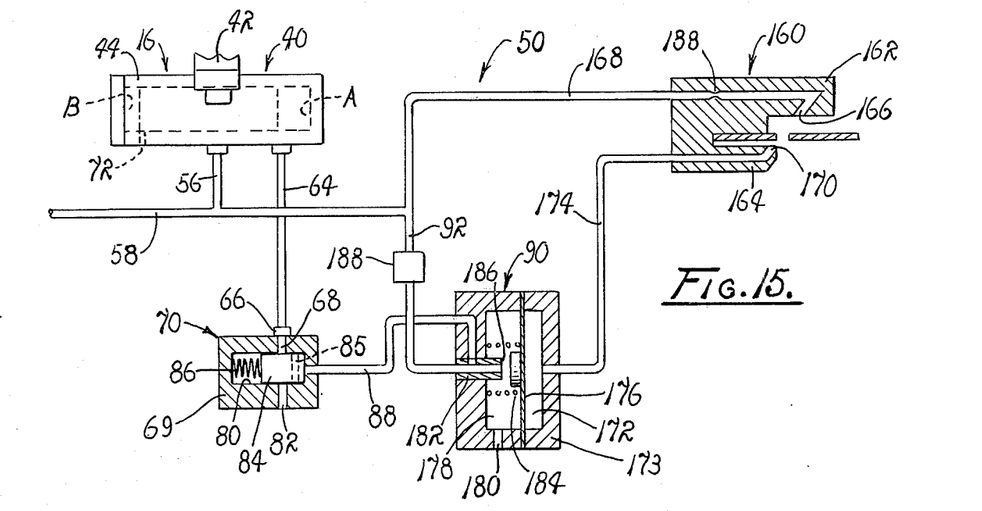
FIG. 15 is a schematic view of a control circuit provided for controlling the operation of a pneumatic hammer included within the vibrator system shown in FIGS. 2 and 3.

The difference in the diameters of the chamber and the mass is such that a fluid passageway 49 is defined between the adjacent surfaces of the chamber 46 and the mass 48, hence, the mass 48 tends to ride on an air bearing as reciprocatory motion is imparted thereto in response to a delivery of air under pressure through the chamber 46 in response to an actuation of a pneumatic control system generally designated 50, FIG. 15.

It is here noted that the housing 44 includes a fluid inlet port 52 having a fitting 54 seated therein. This fitting serves to couple the port 52 with a branch conduit 56 which, in turn, serves to couple the port with a main conduit 58. The main conduit 58 is coupled through a suitable fitting with a suitable source of pneumatic fluid, not shown, maintained under preselected pressures substantially above atmospheric pressure.

The housing 44 further includes a fluid discharge port 60 within which there is seated a fitting 62 which serves to couple the fluid discharge port 60 through a fluid discharge conduit 64. The conduit 64, in turn, terminates in a fitting 66, FIG. 15, seated in an intake bore 68 provided within the housing 69 of a normally closed flow control valve 70. The flow control valve 70 serves to control the operation of the hammer 40 in a manner hereinafter more fully described.

Also formed within the housing 44 of the pneumatic hammer 40, there is a metered exhaust port 72. The exhaust port 72 communicates with sub-chamber B while the fluid discharge port 60 communicates with sub-chamber A. These sub-chambers are disposed at opposite sides of the axis of the fluid inlet port 52 and are spaced apart a distance slightly greater than the length of the mass 48. It will therefore be appreciated that as the mass 48 is caused to reciprocate within the chamber 46, the ports 60 and 72 alternately are closed by the surfaces thereof.

Within the chamber 46, there is provided an annular groove 74. This groove communicates with the fluid inlet port 52 and the passageway 49 so that fluid under pressure delivered to the groove 74, through the inlet port 52, also is introduced into the sub-chambers A and B via the fluid passageway 49 defined between the adjacent surfaces of the mass 48 and the adjacent surface of the chamber 46.

Figure 20:
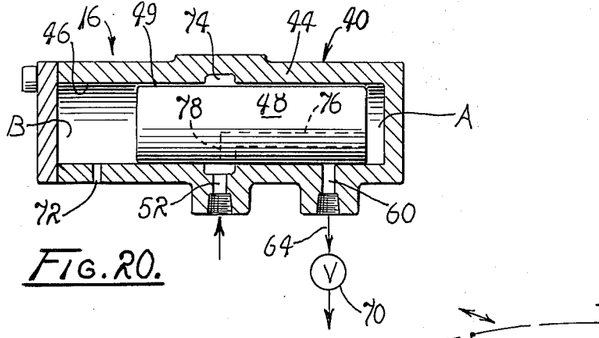

Within the mass 48 there is formed an axially extended bore 76. Extended radially into the mass 48, near the midportion thereof, there is a bore 78 which intersects with the bore 74. The bore 78 is so positioned relative to the mass 48 as to become aligned with the groove 74, once the mass 48 is positioned at one end of its throw, as illustrated in FIG. 20. When the mass 48 is so positioned, the fluid discharge port 60 is closed by the mass for thereby preparing the sub-chamber A to be pressurized while the exhaust port 72 remains open. Thus a pressure differential is established across the mass 48. Conversely, once the mass 48 has been returned to the opposite end of its throw, the surface thereof serves to close the metered exhaust port 72, while the bore 60 is opened. As should readily be apparent, the bore 78 is at this time repositioned relative to the groove 74 so that communication between the fluid intake port 52 and the sub-chamber A is substantially interrupted. Thus a reversed pressure differential is established across the mass 48.

In view of the foregoing, it should readily be understood that the mass 48 is caused to reciprocate in response to an alternate opening and closing of the ports 60 and 72, and that reciprocatory motion thus established will be maintained so long as a discharge of the pneumatic fluid from the chamber 46 is accommodated through the port 60.

So long as fluid under pressure is introduced into the groove 74, the fluid will pass from the groove between the adjacent surfaces of the chamber 46 and the mass 48 into the chamber portions A and B. The capacity of the port 60 is such that so long as a discharge of the fluid under pressure is accommodated, the sub-chamber A experiences no increase in pressure. It is here noted that the capacity of the metered exhaust port 72 is such that the sub-chamber B does not experience an instantaneous pressure drop as the mass 48 is advanced out of closing relation therewith. However, by the time the mass 48 approaches the end of its throw, so that the mass 48 closes the port 60 and the bore 78 becomes aligned with the groove 74, the pressure within sub-chamber B approaches atmospheric pressure. In response to an aligning of the bore 78 with the groove 74, sub-chamber A experiences an instantaneous pressurization which serves to reverse the pressure differential established across the mass 48 and thus causes the mass to return to its initial position within sub-chamber B.

Figures 16, 17, 18, 19:
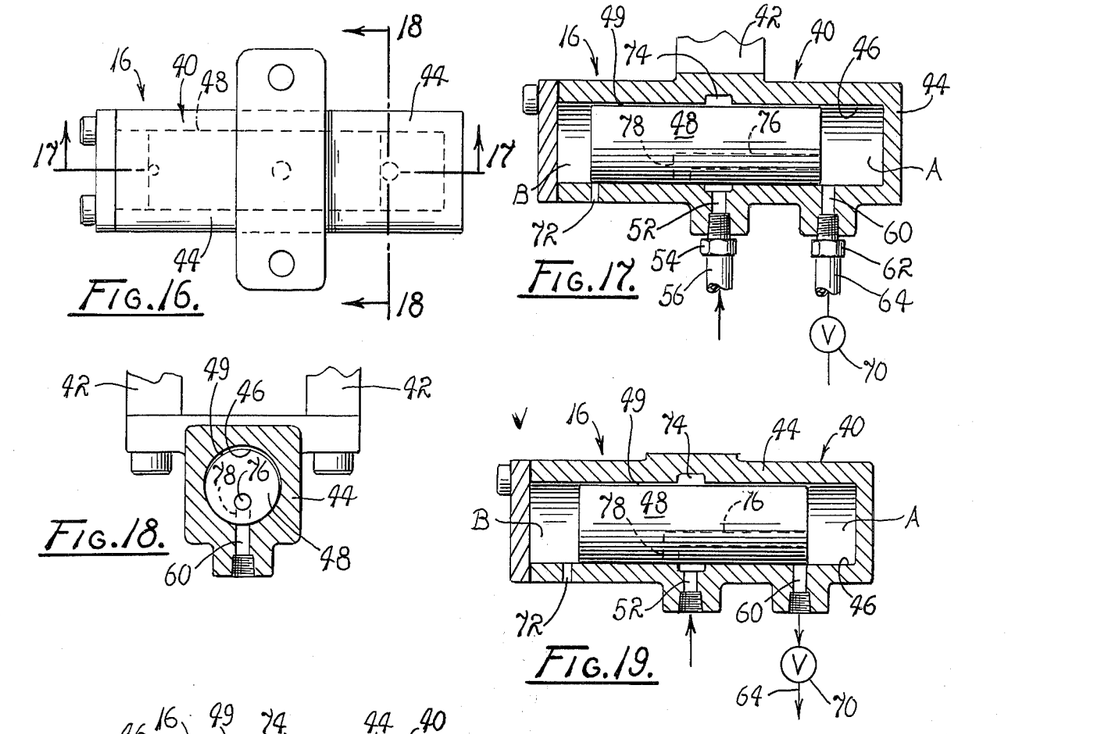
FIG. 16 is a plan view of the pneumatic hammer.
FIG. 17 is a cross sectional view of the hammer taken generally along line 17—17 of FIG. 16.
FIG. 18 is a cross sectional view taken generally along line 18—18 of FIG. 16.
FIGS. 19 and 20 are cross sectional views, similar to the cross sectional view of FIG. 17, which when taken with FIG. 17 collectively illustrate a cycle of operation for said hammer.

This cycle is repeated continuously so long as fluid under pressure is introduced into the chamber 46 via the fluid inlet port 52 and the fluid discharge port 60 is permitted to perform a discharging function for reducing pressure established within the chamber 46. In the event that discharge of pneumatic fluid via the fluid discharge port 60 is terminated, however, a back-pressure rapidly will develop within the sub-chamber A for arresting motion of the mass 48. The mass 48, when at rest, is seated in a port-closing relationship with the port 72, as best illustrated in FIG. 17.

Within the housing 69 of the flow control valve 70 there is established an internal chamber 80 which communicates with ambient atmosphere via an exhaust port 82 provided within the housing 69. As a practical matter, the exhaust port 82 is aligned coaxially with the intake port 68.

Within the chamber 80 there is seated a shuttle block 84 having formed therein a bore 85 through which the intake port 68 and the exhaust port 82 communicate when the shuttle block 84 is seated in a valve-open position, but which is positioned out of alignment with these ports when the shuttle block 84 is seated in a valve-close position. The shuttle block 84 is continuously urged to assume a valve-close position by a compression spring 86 seated in the chamber 80 in an abutting relationship with the shuttle block.

The shuttle block 84 is advanced to its valve-open position in response to pressure delivered to the chamber 80 via a conduit 88 through which the chamber 80 communicates with a valve actuator 90, hereinafter more fully described, and a branch conduit 92 through which the valve actuator communicates with the main conduit 58.

Figure 21:
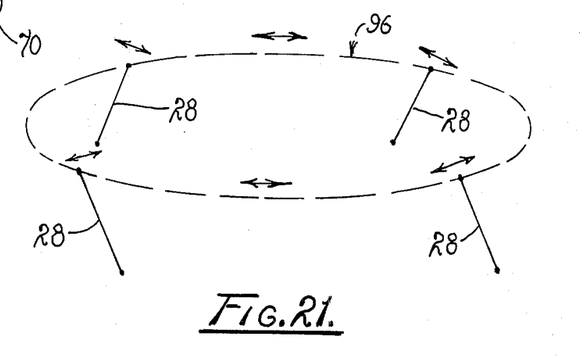
FIG. 21 is a diagrammatic view illustrating the direction of the forces applied to the bowl by the vibrator system of the nail feeder.

It is therefore to be understood that vibratory motion is imparted to the bowl 10 as the mass 48 is caused to reciprocate within the housing 44 of the hammer 40 along an axis angularly related to a vertical plane of symmetry for the bowl 10. This motion includes both rotary and vertical components, as best illustrated by direction arrows, FIG. 21, which serve to advance a plurality of nails with a tossing motion along the delivery way 14.

(Delivery Way)

The delivery way 14 includes a planar surface having a ramp segment 94 which extends to the floor of the bowl 10 from a circular segment 96 which circumscribes the mouth of the bowl. Thus, the delivery way 14 provides an arcuate surface defining a path along which the nails are caused to advance as vibratory motion is imparted to the bowl 10 in response to an activation of the pneumatic hammer 40.

Figure 5:
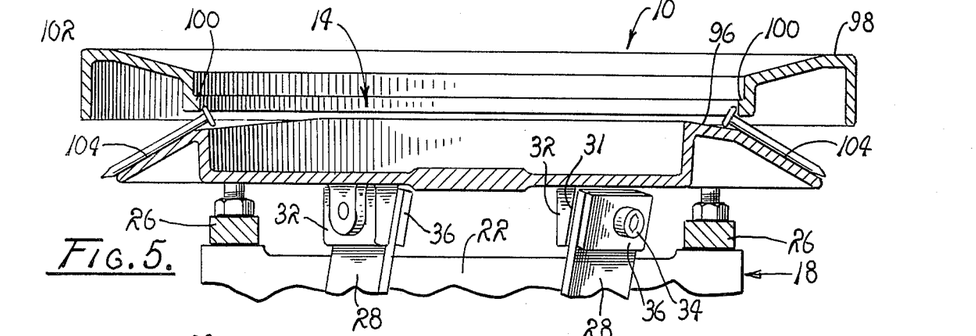
FIG. 5 is a cross sectional view taken generally along line 5—5 of FIG. 1.
Figure 7:
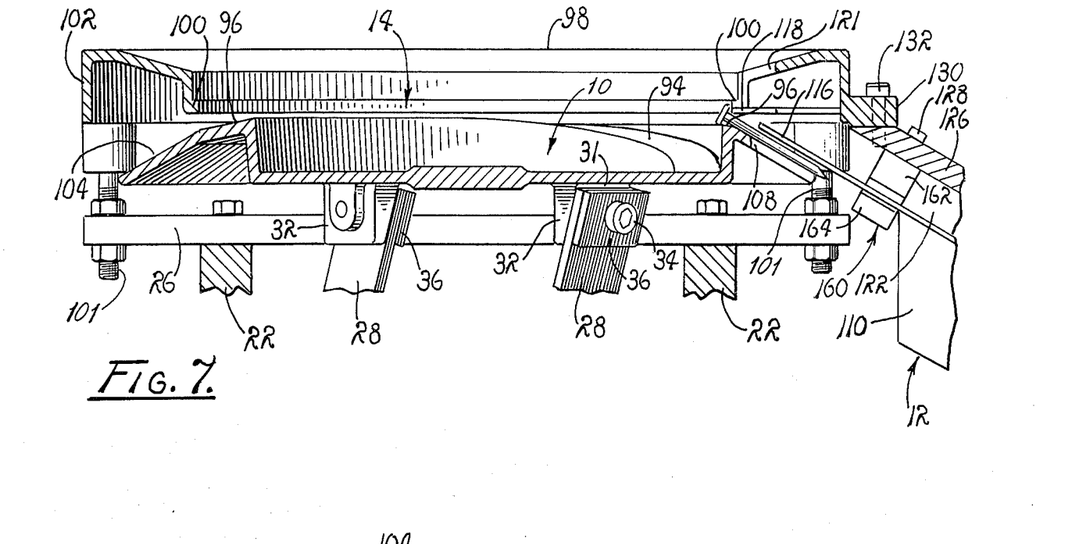
FIG. 7 through FIG. 10 are fragmented, partially sectioned views illustrating an operational sequence whereby a nail is transferred from the delivery way to the base end of the chute.

As best illustrated in FIGS. 5 and 7, the surface of the circular segment of the ramp 96 is projected outwardly and downwardly so that nails advanced along the delivery way 14 are urged to roll toward the outermost edge of the surface. A nail retainer assembly 98 is provided for engaging the heads of the nails for thus arresting the rolling motion. This assembly includes a retainer lip 100 of a circular configuration supported in coaxial relation with the circular segment 96 of the nail delivery way 14, by a plurality of vertically oriented pillars affixed to the assembly and adjustably mounted on the end portions of the sills 26. The nail retainer assembly 98 also includes an annular skirt 102 connected in supported relationship with the distal ends of the sills 26 so that the nail retainer assembly 98 is supported in a fixed relationship with respect to the portable frame 18. Thus the assembly 98 is substantially isolated from the vibratory motion imparted to the bowl 10 by the pneumatic hammer 40.

Of course, the lip 100 is spaced upwardly from the adjacent surface of the circular segment 96 of the delivery way 14 a distance such that the shanks of nails advanced along the delivery way 14 are permitted to pass beneath the lip 100, while the heads of the nails are engaged by the lip so that the nails are suspended by their heads as they are supported for advancement along the delivery way 14.

The shanks of the suspended nails are supported in an inclined disposition by an annular skirt 104 which extends downwardly from the periphery of the surface of the circular segment 96 of the delivery way 14. However, it is to be understood that vibratory motion imparted to the bowl 10 also is imparted to the nail delivery way 14 so that the nails are caused to advance along the surface of the way toward the nail delivery chute 12.

Figure 6:
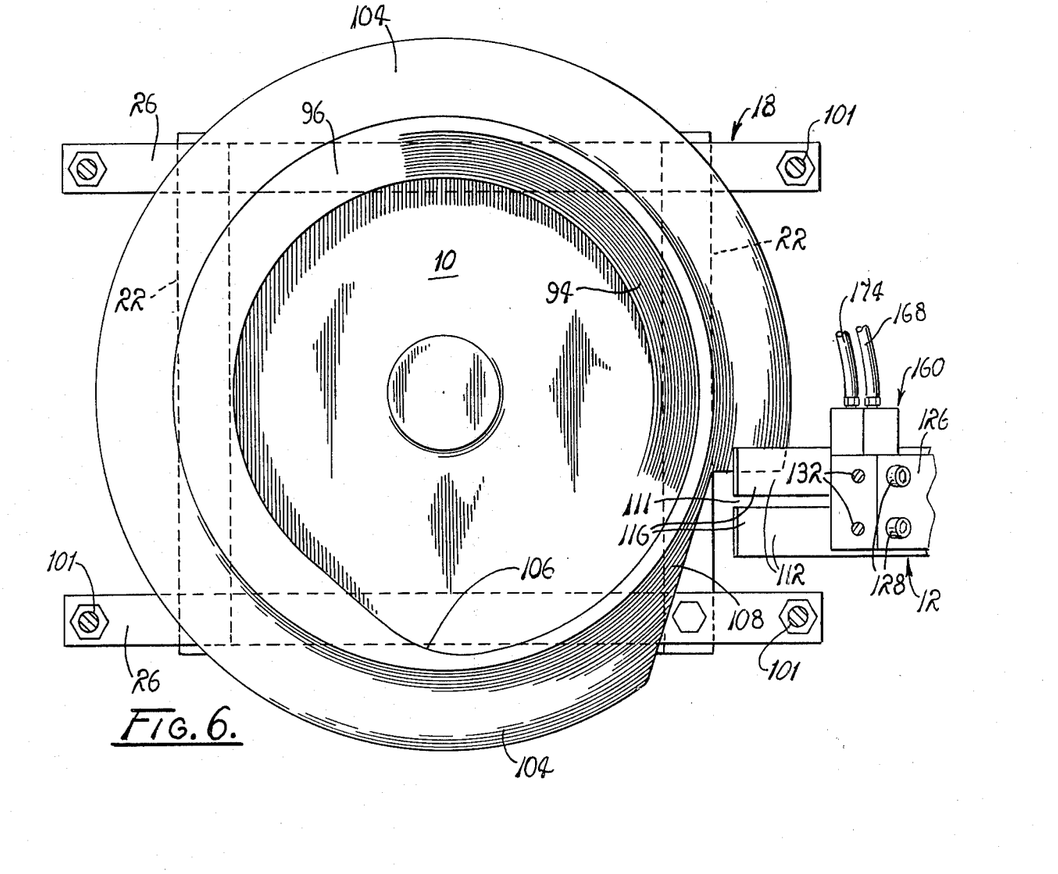
FIG. 6 is a top plan view of the nail receiving bowl shown in FIG. 1.

As best shown in FIG. 6, the circular segment 96 is provided with a segment 106 of a reduced width such that unless the nails are positioned to extend radially from the delivery way 14 the nails are caused to drop back into the bowl 10 before reaching the nail discharge chute 12 as the nails are advanced in response to vibratory motion imparted to the bowl.

Figures 8, 9, 10, 11, 12, 13:
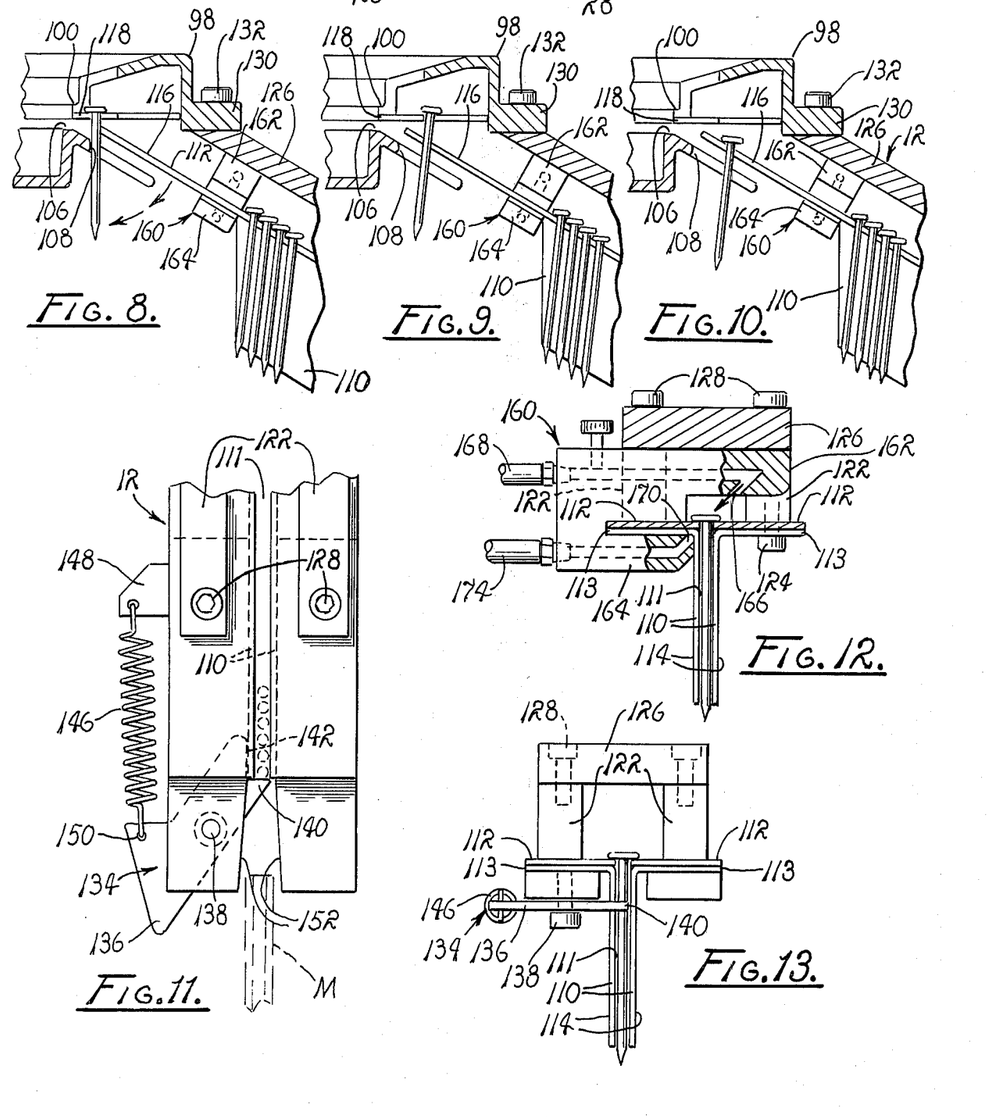
FIG. 11 is a top plan view of the distal end of the nail discharge chute illustrating a moveable gate for restraining nails within the chute.
FIG. 12 is a fragmented, partially sectioned view of a nail sensor provided for detecting the presence of a series of aligned nails in the chute, taken generally along line 12—12 of FIG. 2.
FIG. 13 is an end view of the distal end of the chute shown in FIG. 11.
Figure 14:
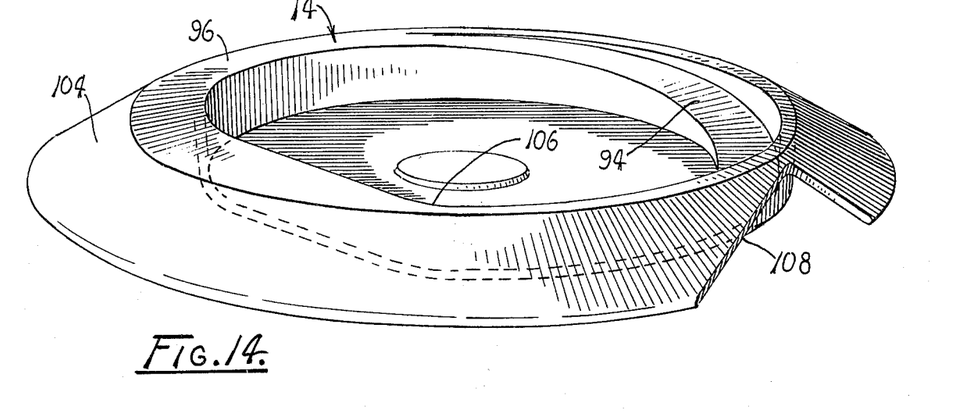
FIG. 14 is a perspective view of the nail receiving bowl.

The skirt 104 is provided with a relieved segment 108, as also illustrated in FIG. 6, so that vertical support for the shanks of the nails is removed as the nails approach the nail discharge chute 12. This permits the nails to pivot to an upright orientation, under the influence of gravity, as best illustrated in FIGS. 7 through 9, preparatory to being transferred from the delivery way 14 to the nail discharge chute 12.

(Nail Discharge Chute)

The nail discharge chute 12 is provided with a pair of inclined rails 110 spaced apart a distance to define therebetween a slot 111 through which the shanks of the nails are permitted to pass as the nails gravitate therealong. Each of the rails 110 includes a planar surface 112, provided along a flange 113 thereof, along which the lowermost surfaces of the heads of the nails slide in supported engagement as the nails gravitate through the discharge chute 12. Each of the flanges 113, in turn, projects from a vertically oriented body 114. The body 114, for each of the rails 110, includes a zone of truncation adjacent to the delivery way 14 while the flange 113 projected therefrom includes a zone of projection extended into close proximity with the circular segment 96 of the delivery way 14. The zones of projection for the flanges 113 establish a nail catcher 116 for receiving the nails as they are transferred from the delivery way 14 to the discharge chute 12.

Figure 4:
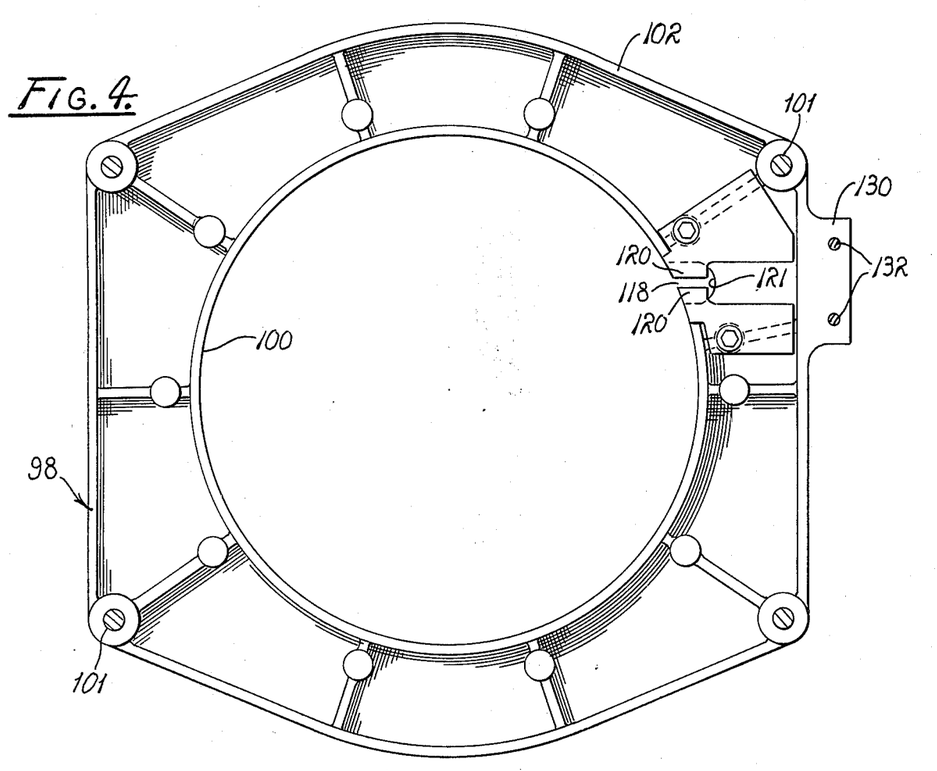
FIG. 4 is a bottom plan view of the nail retainer shown in FIGS. 1 and 2.

In order to effect a transfer of the nails from the delivery way to the discharge chute 12, the nail retainer assembly 98 is provided with a slotted relief 118 also referred to herein as a passageway, formed within the lip 100, as best shown in FIGS. 4 and 5. The relief 118 is defined between a pair of lips 120 and extends radially with respect to the circular segment 96. In practice, the passageway 118 is of a width sufficient to accommodate the passage of shanks of nails therethrough while the lips 120 at each side of the relief support the heads of the nails.

As a practical matter, the lips 120 are established by a pair of plates, not designated, affixed to the retainer assembly 98 beneath an access opening 121 formed in the retainer assembly. Thus, it can be appreciated that as each succeeding nail is caused to advance along the circular segment 96 of the delivery way 14, with the shanks thereof being supported by the skirt 104, FIG. 5, the nail is permitted to pivot to an upright position as it passes beneath the passageway 118.

It is to be understood that as each of the nails is permitted to pivot to an upright position, the heads thereof advance along an arcuate path and are thus caused to be received by the lips 120 so that the nail is suspended in an upright position by the lips 120, immediately adjacent the nail catcher 116 defined by the zones of projection for the flanges 113 of the rails 110. It is here noted that the catcher 116 is so oriented that the shanks of the nails are permitted to pass therebeneath prior to reaching the passageway 118, as best illustrated in FIG. 7.

Once the nails are received by the lips 120 they are caused to advance radially relative to the bowl 10 and subsequently drop from the lips 120 into a supported relationship with the catcher 116. Thereafter, the nails are permitted to gravitate along the rails 110 in single file to thus establish therefor an ordered alignment as they advance through the nail discharge chute 12.

Extended along each of the flanges 113 and affixed thereto in spaced relation with the slot 111, there is an elongated mounting pad 122. Each of the mounting pads 122 is connected with the flange 113 employing suitable means such as screws 124 and the like. Affixed to the upper surfaces of the mounting pads 122, in turn, there is a hanger plate 126. This plate is connected with the mounting pads 122 by suitable means including screws 128 and, in turn, is fastened to a rigid flange 130 projected outwardly from the skirt 102 of the nail retainer assembly 98. The hanger plate 126 and the flange 130 are suitably mated and are fastened together through the use of screws 132 which serve quite satisfactorily for this purpose.

It should therefore be understood that the discharge chute 12 is supported by the retainer assembly 98 and serves to receive a plurality of nails delivered thereto from the floor of the bowl 10 by the delivery way 14, via the passageway 118. Moreover, the nails are caused to form an ordered alignment preparatory to their being discharged from the discharge chute to a nail magazine or similar receiver mated with the discharge chute at a gate 134.

The gate 134 is affixed to the lowermost ends of the rails 110 and includes a bifurcated dog 136 pivotally suspended from one of the flanges 113 by pivot pin 138 extended therethrough near the lowermost end thereof.

The dog 136 includes a retainer lip 140 and a motion limiting stop 142. A suitable relief, not designated, is formed in the body 114 beneath flange 113 from which the dog is suspended in order to accommodate a repositioning of the lip 140 transversely across the slot 111 defined between the rails 110, for engaging the leading nail of the file formed within the slot for thus selectively arresting the file and inhibiting further gravitational motion.

In order to urge the retainer lip 140 into an arresting relationship with the file of nails within the discharge chute 12, a tension spring 146, anchored at a bracket 148 is connected with the dog 136 at an extended end 150 in a manner such that the dog is continuously urged to pivot about the pin 138 in a direction suitable for positioning the lip 140 across the slot 111.

It is important here to note that the distal end of the discharge chute 12 includes a guide slot 152 suitably configured for receiving the projected or distal end of a magazine for a nailer, or similar receptacle, herein designated M. As the magazine M is advanced into the slot 152, it is caused to engage the adjacent surface of the dog 136 for causing the dog to rotate about the pivot pin 138 against the forces of the spring 146. Thus the retainer lip 140 is withdrawn from the slot 111. Once the retainer lip is withdrawn from the slot 111, the file of nails is free to gravitate downwardly into the magazine. Once the magazine is withdrawn from the guide slot 152, the spring 146 causes the lip 140 to return to its initial position across the slot 111.

The effective length of the slot 111, of course, serves to determine the number of nails which can at any one time be placed in ordered alignment. Moreover, once the slot 111 has thus been charged, it is desirable to terminate the operation of the feeder until such time as the nails have been discharged from the chute 111 and a recharging thereof is desired. Therefore, a nail sensing device 160, mounted on the nail delivery chute 112 and connected with the valve actuator 90, is provided to detect the absence of nails within the slot 111 and thus provide a pneumatic signal to the valve actuator 90 indicative of the absence. This signal is transmitted to the valve actuator 90 and there utilized for causing the shuttle block 84 to open the intake port 68 of the flow control valve 70 and initiate operation of the vibrator assembly 16.

As hereinbefore mentioned, once the shuttle block 84 is displaced to open the intake port 68, no back pressure develops within the chamber 46 of the pneumatic hammer 40 thus reciprocation of the mass 48 is accommodated.

As best illustrated in FIG. 15, the nail sensing device 160 includes a pressure head 162 and a pressure acceptance head 164 mounted on the incline nail delivery chute 12, near the uppermost end thereof. The pressure head 162 includes a fluid jetting orifice 166 connected with the main conduit 58 through a branch conduit 168. In coaxial alignment with the orifice 166, the pressure acceptance head 164 is provided within a fluid acceptance port 170. The fluid jetting orifice 166 and the fluid acceptance port 170 are oppositely directed across the slot 111, between the rails 110, so that pneumatic communication therebetween is established as a jet of pneumatic fluid is discharged from the orifice 166 and is accepted by the fluid acceptance port 170, after having passed through the slot 111. Consequently, pneumatic communciation between the ports 166 and 170 is interrupted as a file of nails is established within the slot 111. It therefore is to be understood that once the slot 111 is filled with a file of nails, pneumatic communication between the ports 166 and 170 is interrupted, whereupon the pneumatic signal transmitted to the valve actuator 90 is terminated.

In order to achieve a transmission of the pneumatic signal, the port 170 is connected with a plenum chamber 172, defined within the housing, designated 173, of the valve actuator 90, via an interconnecting conduit 174. The plenum chamber 172 is of a cup-shaped configuration and is sealed by a flexible diaphragm 176 seated within the housing. Therefore, the pressure of the pneumatic fluid discharged from the fluid jetting orifice 166 and received by the fluid acceptance port 170 is transmitted to the plenum chamber 172, via the conduit 174, for causing the plenum chamber to become pressurized, whereupon the diaphragm 176 is caused to distend and project away from the plenum chamber 172.

Disposed in direct opposition to the plenum chamber 172, within the housing 173 of the valve actuator 90, there is provided an exhaust chamber 178 which also is closed by the diaphragm 176. The exhaust chamber 178 is in continuous communication with ambient atmosphere via an exhaust duct 180 and the conduit 92 via a standpipe 182, extended through the housing 173, and having a suitable bore, not designated, provided in the wall thereof through which the standpipe and the conduit 92 communicate, FIG. 15. Thus, a delivery of fluid under pressure to and from the chamber 178 is facilitated via the standpipe and the exhaust duct 180, respectively.

As a practical matter, a compression spring, of a helical configuration, is seated in the exhaust chamber 178 in engagement with the face of the diaphragm 176 for continuously urging the diaphragm in displacement toward the plenum chamber 172.

The standpipe 182 also is connected with the conduit 88 through a radially extended bore, not designated, provided therein. Thus, the conduit 88 also is caused to communicate with the branch conduit 92 and with the exhaust chamber 178 through the standpipe 182. Therefore, the chamber 80 of the flow control valve 70 is both charged and discharged through the conduit 88.

From a review of FIG. 15, it will therefore be appreciated that the innermost face 186 of the standpipe 182 is in juxtaposition with the face of the diaphragm 176, opposite the plenum chamber 172. Consequently, as the diaphragm is distended from the chamber 172, it is caused to seat on the face 186 of the standpipe 182 and serves to substantially seal the standpipe. Pneumatic fluid under pressure conducted from the main conduit 58 by the branch conduit 92 is transmitted to the flow control valve 70, via the conduit 88, and caused to impinge upon the face of the shuttle block 84 in response to a seating of the diaphragm on the face of the standpipe. Impingement of the fluid on the face of the shuttle block 84 causes it to move against the forces applied by the spring 86 for thus causing the bore 85 to be brought into alignment with the exhaust port 82. This alignment of the bore 85 initiates reciprocation of the mass 48, in the manner hereinbefore described.

As a practical matter, flow restrictors 188 are interposed in the branch conduits 92 and 168 for restricting the flow of the pneumatic fluid as it is delivered through these branch conduits from the main conduit 58.

OPERATION

It is believed that in view of the foregoing description, the operation of the device will readily be understood and it will be briefly reviewed at this point.

With the nail feeder assembled in the manner hereinbefore described, and connected with a source of pneumatic fluid, through the main conduit 58, it is prepared for operation.

Once pneumatic fluid under pressure is delivered to the pneumatic hammer 40 operation of the vibrator 16 is initiated. Referring for a moment to FIG. 17, it will be appreciated that the mass 48 initially is seated in a position such that the metered exhaust port 72 is closed by the mass 48 while the discharge port 60 is open. Assuming that no nails are present within the slot 111, established between the rails 110, pneumatic fluid under pressure exists the fluid jetting orifice 166 and enters the fluid acceptance port 170. This fluid is conducted via the conduit 174 to the plenum chamber 172. Thereupon, the diaphragm 176 is distended and seated on the face 186 of the standpipe 182 for thus substantially sealing the adjacent end of the standpipe. Consequently, pneumatic fluid under pressure now is delivered via the branch conduit 92, the standpipe 182 and the conduit 88 to impinge against the face of the shuttle block 84 seated within the housing 69 of the flow control valve 70 for causing the shuttle block to move against the applied forces of the spring 86 through a distance sufficient to align the bore 85 between the fluid intake port 68 and the exhaust port 82. This alignment of the bore 85 causes the sub-chamber A of the chamber 46 to vent to atmosphere.

With the sub-chamber A vented to atmosphere, pneumatic fluid under pressure delivered to the chamber 46, via the branch conduit 56 is delivered to the sub-chamber portion B via the groove 74 and the passageway 49 established between the adjacent surfaces of the mass 48 and the wall of the chamber 46. Of course, pneumatic fluid under pressure simultaneously is delivered to the sub-chamber A via the passageway 49, however, this fluid rapidly is exhausted to atmosphere via the conduit 64 and the exhaust port 82 of the flow control valve 70. As a consequence of the pressure of the fluid delivered to sub-chamber B, a first pressure differential is established across the mass 48 and the mass responsively is driven toward sub-chamber A. The metering port 72 is sufficiently restricted as to preclude an instantaneous drop of pressure within the sub-chamber B. By the time the mass 48 is advanced to close the fluid discharge port 60, pressure within the sub-chamber B has approached atmospheric pressure.

At approximately the same time that the fluid discharge port 60 is closed by the mass 48, the bore 78 is brought into radial alignment with the groove 74, whereupon pneumatic fluid under pressure is transmitted to the sub-chamber A via the bore 76, which communicates with the bore 78. At this instant, pressure within the sub-chamber A substantially exceeds the pressure within sub-chamber B so that a reversed pressure differential is established across the mass, whereupon the mass 48 is driven in a reverse direction toward the metered exhaust port 72. Once the fluid discharge port 60 is again uncovered and the metered exhaust port 72 is closed, a reversed pressure differential is established across the mass 48 and another cycle of operation is thereby initiated. Thus, the mass 48 is driven with reciprocatory motion so long as the shuttle block 84 remains seated so that the bore 85 remains in alignment between the intake port 68 and the exhaust port 82 of the flow control valve 70 for venting sub-chamber A.

As the mass 48 is driven in reciprocation, the bowl 10 is rapidly elevated and arcuately advanced and subsequently lowered and arcuately retracted due to the effects of the inclined, flexible support members 28. This motion, in turn, causes the bulk of nails to advance in a tossed fashion and "climb" the ramp segment 94 of the delivery way 14. As the nails reach the circular segment 96 of the delivery way, the shanks tend to roll between the upper surface of the delivery way and the lower surface of the lip 100 of the nail retainer assembly 98. The retainer assembly 98 remains substantially stationary due to the fact that it is supported by the pillars 101 mounted on the sills 26 which are, in turn, affixed to the frame members 22. The heads of the nails are engaged by the lip 100 and suspended thereby as the nails are advanced along an arcuate path defined by the circular segment 96. Of course, in the event that any nail reaches the relieved segment 106 of the circular segment 96 of the delivery way, without having become so oriented that the shanks thereof are extended radially with respect to the circular segment 96, the nail is caused to drop off the delivery way, back into the bowl 10.

As the nails progress along the circular segment 96 of the nail delivery way, the shanks thereof are supported by the inclined skirt 104, which circumscribes the circular segment 96. As the nails approach the passageway 118, provided in the nail retainer assembly 19, the shanks thereof are caused to progress across the relieved segment 108 of the skirt 104 so that the weight of the shank of the nails urges the nails to pivot to an upright disposition. However, due to the restraining effects of the lip 100, the nails remain in a radially inclined disposition until reaching the passageway 118, whereupon each of the nails is released by the lip 100 and is free to pivot to an upright position as it becomes aligned with the relief. As each of the nails is pivoted to an upright position, the heads thereof are elevated along an arcuate path and brought into a supported relationship with the pair of lips 120. Each nail thus supported by the lips 120 has a propensity to move radially, relative to the bowl 10, due to the vibratory motion of the bowl, and drop downwardly, into engagement with the nail catcher 116. Due to the inclination of the rails 110, the nails are caused to gravitate, one at a time, downwardly through the slot 111 toward the gate 134 and into engagement with teh retainer lip 140 of the spring-loaded dog 136. Thus, the nails are serially delivered to the nail discharge chute 12 and are arranged in an ordered alignment. It is here noted that a rather large percentage of the nails traverse the relief 118 without achieving suitable alignment and, consequently, do not pivot to an upright position. These nails merely advance along the segment 96 through 360° of progression without "jamming" the feeder.

Delivery of the nails to the slot 111 continues until the slot 111 becomes filled for thus positioning a file of nails between the fluid jetting orifice 166 and the fluid acceptance port 170 at which time communication between the orifice 166 and the port 170 is interrupted.

Once the nails interrupt pneumatic communciation between the orifice 166 and the port 170, the compression spring 184 within the housing 173 of the valve actuator 90 becomes effective for causing the diaphragm 176 to disengage the face 186 of the standpipe 182, whereupon the chamber 80 of the flow control valve 70 is vented to atmosphere, via the conduit 88 and the exhaust duct 180. The spring 86 now becomes effective for displacing the shuttle block 84, within the housing 69 whereby the bore 85 becomes misaligned with respect to the intake port 68 and the exhaust port 82. Thus the intake port 68 is closed.

In response to a closing of the intake port 68, back pressure is established within sub-chamber A of the chamber 46 of the pneumatic hammer 40. Thereupon, reciprocatory motion of the mass 48 is terminated. Of course, termination of the reciprocatory motion of the mass 48 causes the vibrator 16 to become quiescent. Moreover, since the mass 48, when at rest, is seated in a closing relationship with the port 72, a tendency for the mass to assume a "dead center" position is avoided.

Upon insertion of a magazine, designated M, into the guide slot 152, the dog 136 is pivoted for removing the lip 140 from the path of the file of nails within the slot 111. Due to the inclination of the rails 110, of the discharge chute 12, the file of nails is permitted to gravitate into the magazine M. Upon removal of the magazine from the slot 152, the lip 140 again is positioned across the slot 111 and operation of the pneumatic hammer 40 is again initiated, due to the communication between the orifice 166 and port 170 thus established.

In view of the foregoing, it should readily be apparent that the feeder of the instant invention provides a practical solution to the perplexing problem of arranging in an ordered alignment a plurality of nails delivered to the feeder in bulk form.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A feeder adapted to serially deliver a plurality of headed objects, comprising:
    A. a base;
    B. means including a vertically oriented open bowl supported for motion relative to said base and adapted to receive in confining relation an unordered mass of similarly configured headed objects, each having a head and an elongated shank projected axially from the head;
    C. a discharge chute supported in juxtaposition with said bowl and disposed in a vertically oriented plane extended radially with respect to said bowl, including a pair of inclined rails arranged in mutual parallelism and defining within said plane an inclined channel adapted to receive the shanks of a plurality of headed objects supported by the heads thereof for gravitational motion along said pair of inclined rails;
    D. delivery means including an object delivery way having an object supporting surface of an arcuate configuration circumscribing a portion of the top of said bowl for serially delivering a plurality of objects from said bowl into coplanar relation with said channel;
    E. transfer means for transferring headed objects from said delivery way to said discharge chute including means for simultaneously elevating and translating the head of each object; and
    F. means for imparting vibratory motion to said bowl relative to said base.

2. The feeder of claim 1 wherein said delivery way further includes an inclined object supporting surface defining within said bowl an object delivery ramp communicating with said object supporting surface of an arcuate configuration.

3. The feeder of claim 1 wherein said delivery way further includes an inclined surface segment defining within said bowl a delivery ramp, and said object supporting surface is of an annular configuration and defines a circular path about the top of said bowl.

4. The feeder of claim 1 wherein said means for imparting vibratory motion to said bowl comprises a pneumatic hammer.

5. The feeder of claim 1 wherein said discharge chute further includes selectively operable gate means disposed adjacent to said channel for selectively supporting said objects against gravitational motion.

6. The feeder of claim 5 wherein said gate means includes a spring biased pivotal dog having a lip extended between said rails.

7. The feeder of claim 6 wherein said gate means further includes means defining a throat adapted to receive one end of a magazine.

8. The feeder of claim 7 further comprising an object receiving magazine seated in said throat in an engaged relationship with said pivotal dog.

9. The feeder of claim 1 further comprising means for orienting said objects into a substantially radially extended relationship with said bowl including an object retainer having an object engaging lip of an arcuate configuration rigidly mounted on said base and supported against motion relative thereto in an elevated relationship with said object supporting surface and having an object engaging surface adapted to simultaneously engage said plurality of objects as the objects are delivered into coplanar relation with said channel.

10. The feeder of claim 9 wherein said means for orienting said objects further includes an inclined skirt supported by said bowl in concentric relation with said object supporting surface for engaging in supporting relation the shanks of the plurality of objects.

11. The feeder of claim 10 wherein said transfer means includes means for serially imparting to said objects pivotal motion in said vertically oriented plane.

12. The feeder of claim 11 wherein said means for imparting to said objects pivotal motion in said vertically oriented plane includes a surface of truncation, defining a truncated portion of the skirt, for serially engaging the shank of each of said objects between the head and the center of mass thereof, and means for serially receiving said objects including a pair of laterally spaced lips disposed adjacent to one end of said discharge chute for receiving the heads of said objects in a supported relationship and defining therebetween a passageway extended radially with respect to said bowl in coplanar relation with said channel for serially receiving the shanks of the objects.

13. The feeder of claim 1 wherein said means for imparting vibratory motion to said bowl includes a plurality of resilient support members affixed to said base and connected to said bowl in a supporting relationship therewith, and means defining a selectively operable pneumatic hammer mounted on said bowl for imparting thereto vibratory motion.

14. The feeder of claim 13 further comprising a pneumatic control circuit connected with said pneumatic hammer including control means mounted on said discharge chute for controlling the operation of said hammer, including valve means responsive to an absence of objects in said discharge chute for initiating operation of said pneumatic hammer.

15. The feeder of claim 13 wherein said pneumatic hammer comprises:
   A. an elongated hermetically sealed housing having defined therein a chamber of an elongated configuration;
   B. an elongated axially reciprocable mass seated in said chamber having a length less than the length of said chamber;
   c. means for imparting rectilinear reciprocation to said mass for displacing the mass between a first position at a first end portion of said chamber and a second position at a second end portion of the chamber opposite the first end portion of the chamber including a source of pneumatic fluid, an annular groove circumscribing the chamber near the midportion thereof, means defining in the midportion of said housing a fluid inlet port communicating with said groove and connected with said source of pneumatic fluid for continuously delivering fluid under pressure to said chamber, means defining in a first end portion of said housing a fluid discharge port for discharging pneumatic fluid from said one end of said chamber, means defining in a second end portion of said housing opposite said first end portion a metered exhaust port for exhausting fluid from the second end portion of said chamber, said exhaust port and said discharge port being spaced apart a distance greater than the length of said mass, whereby the mass is caused to close the exhaust port and the discharge port alternately as reciprocatory motion is imparted to the mass, and means for alternately establishing a pressure differential across said mass including an axially extended fluid delivery bore defined in one end of said mass and communicating with said first end portion of said chamber, a radially extended fluid receiving bore defined near the midportion of said mass intersecting said axially extended bore adapted to communicate with said fluid inlet port when the mass is in said first position for delivering pneumatic fluid under pressure to said first end portion of said chamber while the second end portion of the chamber is vented, and means defining a passageway along the surface of said mass and extended between said groove and the second end portion of said chamber for delivering pneumatic fluid under pressure to the second end portion of the chamber when said mass is in said second position and pneumatic fluid is being discharged from said fluid discharge port.

16. The feeder of claim 15 further comprising a pneumatic control circuit connected with said pneumatic hammer including means for arresting reciprocation of said mass comprising a normally closed valve connected with said fluid discharge port for interrupting the discharge of pneumatic fluid from said housing.

17. The feeder of claim 16 wherein said normally closed valve includes a valve housing having an hermetically sealed valve chamber defined therein, means defining in said valve housing a pressure inlet port connected in communication with said fluid discharge port for pressurizing said valve chamber, means defining in said valve housing a vent for venting the valve chamber to atmosphere, a shuttle block seated in said valve chamber and supported for reciprocatory motion between a first position and a second position and having a sealing surface for sealing said pressure inlet port when said shuttle block is in said first position, and biasing means seated in said chamber adjacent to said shuttle block for continuously urging the shuttle block in displacement toward said first position.

18. The feeder of claim 17 wherein said control circuit further includes means for opening the valve in response to an absence of objects in said discharge chute including a selectively operable valve actuator connected with said valve.

19. The feeder of claim 18 wherein said means for opening the valve further comprises:
   object sensing means mounted on said discharge chute for sensing the absence of headed objects in the discharge chute comprising a pressure head mounted on said discharge chute including a fluid jetting orifice directed toward the chute at one side thereof and connected with said source of fluid, a fluid acceptance head mounted on said discharge chute at the side thereof opposite said pressure head and having a fluid acceptance port directed toward said chute in coaxial alignment with said fluid jetting orifice, whereby objects delivered to said chute are caused to pass between said jetting orifice and said fluid acceptance port for interrupting fluid communication established therebetween.

20. The feeder of claim 19 wherein said valve actuator comprises a valve actuator housing, a pressure chamber defined within said valve actuator housing connected in communication with said fluid acceptance port, a flexible diaphragm seated in said pressure chamber and adapted to be flexed in response to a delivery of fluid from said fluid jetting orifice to said fluid acceptance port, means including a fluid conduit connected with said source of pneumatic pressure and extended to said valve actuator housing, and means connected with said conduit and with said valve chamber for opening said valve, including means for directing fluid under pressure to impinge on said shuttle block for displacing said shuttle block toward said second position in response to a flexing of said diaphragm.

21. A feeder adapted to serially deliver a plurality of headed objects comprising:
   A. a base;
   B. means including a vertically oriented open bowl supported for motion relative to said base and adapted to receive in confining relation an unordered mass of similarly configured headed objects, each having a head and an elongated shank projected axially therefrom;
   C. a discharge chute rigidly supported by said base in juxtaposition with said bowl;
   D. delivery means for serially delivering a plurality of objects from said bowl to said chute including an object delivery way having a first surface segment of an arcuate configuration circumscribing a portion of the top of said bowl and a second surface segment extending from said first surface segment downwardly into said bowl; and E. means for orienting said objects into a substantially radially extended relationship with said bowl, including an object retainer of an arcuate configuration rigidly supported by said base against motion relative thereto in an elevated relationship with said first surface segment having an object engaging surface adapted to simultaneously engage the heads of said plurality of objects as the objects are delivered by said delivery means.

22. A feeder adapted to deliver a plurality of headed objects comprising:

A. a base;

B. means including a vertically oriented open bowl supported for motion relative to said base and adapted to receive in confining relation an unordered mass of similarly configured headed objects, each having a head and an elongated shank projected axially from the head;

C. a discharge chute supported in juxtaposition with said bowl and disposed in a vertically oriented plane extended radially therefrom, including a pair of inclined rails arranged in mutual parallelism and defining therebetween an inclined channel adapted to receive therebetween the shanks of a plurality of headed objects supported for gravitational motion by said pair of inclined rails;

D. delivery means including an object delivery way having a first object supporting surface of an annular configuration circumscribing said bowl adapted to deliver a plurality of headed objects along an endless path, and a second object supporting surface defining a ramp extending from said first object supporting surface into said bowl adapted to deliver to said first object supporting surface a plurality of headed objects; and E. transfer means for transferring headed objects from said first object supporting surface to said inclined channel.

23. In a vibrator having particular utility with a nail feeder, a pneumatic hammer comprising:

A. an elongated hermetically sealed housing having defined therein a chamber of an elongated configuration;

B. an elongated axially reciprocable mass seated in said chamber having a length less than the length of the chamber; and C. means for imparting rectilinear reciprocation to said mass for displacing the mass between a first position at a first end portion of said chamber and a second position at a second end portion of the chamber opposite the first end portion of the chamber, including a source of pneumatic fluid, an annular groove circumscribing the chamber, near the midportion thereof, means defining in the midportion of said housing, a fluid inlet port communicating with said groove and connected with said source of pneumatic fluid for continuously delivering fluid under pressure to said chamber, means defining in a first end portion of said housing a fluid discharge port for discharging pneumatic fluid from said first end portion of said chamber, means defining in a second end portion of said housing opposite said first end portion a metered exhaust port for exhausting fluid from the second end portion of said chamber, said exhaust port and said discharge port being spaced apart a distance greater than the length of said mass, whereby the mass is caused to close the exhaust port and the discharge port alternately as reciprocatory motion is imparted to the mass, and means for alternately establishing a pressure differential across said mass including an axially extended fluid delivery bore defined in one end of said mass and communicating with said first end portion of said chamber, a radially extended fluid receiving bore defined near the midportion of said mass intersecting said axially extended bore adapted to communicate with said fluid inlet port when the mass is in said first position for delivering pneumatic fluid under pressure to said first end portion of said chamber while the second end portion of said chamber is vented, and means defining a passageway along the surface of said mass and extended between said groove and the second end portion of said chamber for delivering pneumatic fluid under pressure to the second end portion of the chamber when the mass is in said second position and pneumatic fluid is being discharged from said fluid discharge port.

24. The vibrator of claim 23 further comprising a pneumatic control circuit connected with said pneumatic hammer including means for arresting reciprocation of said mass comprising a normally closed valve connected with said fluid discharge port for interrupting the discharge of pneumatic fluid from said housing whereby the mass is caused to come to rest in a closing relationship with said metered exhaust port.

25. The vibrator of claim 24 wherein said normally closed valve includes a valve housing having an hermetically sealed valve chamber defined therein, means defining in said valve housing a pressure inlet port connected in communication with said fluid discharge port for pressurizing said valve chamber, means defining in said valve housing a vent for venting the valve chamber, to atmosphere, a shuttle block seated in the valve chamber and supported for reciprocatory motion between a first positon and a second position and having a sealing surface for sealing said pressure inlet port when said shuttle block is in said first position, and biasing means seated in said chamber adjacent to said shuttle block for continuously urging the shuttle block in displacement toward said first position.

26. The vibrator of claim 25 wherein said control circuit further includes means for selectively displacing said shuttle block for opening the valve.

* * * * *